(12) United States Patent
Bali et al.

(10) Patent No.: US 12,550,873 B2
(45) Date of Patent: Feb. 17, 2026

(54) HIGHLY AVAILABLE MULTIMEDIA OCEAN PERCEPTION SYSTEM

(71) Applicant: Oceaneering International, Inc., Houston, TX (US)

(72) Inventors: Rohit Bali, Nawanshahr (IN); Blanca Montoya, Houston, TX (US); Narayanan Vidyadharan Rajeev, Kerala (IN); Vemburajan Yadava, Pune (IN); Sheethal Sasidjaran, Kerala (IN)

(73) Assignee: Oceaneering International, Inc., Houston, TX (US)

( * ) Notice: Subject to any disclaimer, the term of this patent is extended or adjusted under 35 U.S.C. 154(b) by 140 days.

(21) Appl. No.: 18/219,281

(22) Filed: Jul. 7, 2023

(65) Prior Publication Data
US 2024/0008459 A1    Jan. 11, 2024

(51) Int. Cl.
  *A01K 61/90*  (2017.01)
  *H04W 4/021*  (2018.01)
  *H04W 4/029*  (2018.01)

(52) U.S. Cl.
  CPC ............ *A01K 61/90* (2017.01); *H04W 4/021* (2013.01); *H04W 4/029* (2018.02); *A01K 2227/10* (2013.01)

(58) Field of Classification Search
  CPC ... A01K 61/90; A01K 2227/10; H04W 4/029; H04W 4/021
  See application file for complete search history.

(56) References Cited

U.S. PATENT DOCUMENTS

| | | | |
|---|---|---|---|
| 2012/0088541 A1* | 4/2012 | Rofougaran | H04B 1/406 455/552.1 |
| 2020/0167250 A1* | 5/2020 | Smeaton | G06F 3/067 |
| 2021/0192176 A1* | 6/2021 | Galerne | H04W 84/18 |

* cited by examiner

*Primary Examiner* — John J Lee
(74) *Attorney, Agent, or Firm* — Maze IP Law, P.C.

(57) ABSTRACT

A system comprising data input ports and sensors operatively in communication with the data input ports; a data processor operatively in communication with the sensors; and software aggregates data in the data processor obtained from the plurality of sensors into a set of incoming data streams; time stamps, organizes, and records the organized time stamped set of incoming data streams in the data recorder; and performs a predetermined set of algorithmic manipulations on the organized time stamped set of incoming data streams to allow display of the organized time stamped set of incoming data streams in an actionable format in real time on the display to make a human aware of events occurring in a monitored area and provide an actionable insight.

20 Claims, 2 Drawing Sheets

HIGHLY AVAILABLE MULTIMEDIA OCEAN PERCEPTION SYSTEM

BACKGROUND

Currently, piling is limited to hours when human eyes can identify marine mammalian species. Furthermore, construction of offshore wind farms has installation processes that are noisy and potentially harmful to marine mammals near ongoing pile driving operations. Regulations and guidelines that protect marine mammals from these loud disturbances require knowledge of protected mammalian species when they are within a specific distance of foundation piling activities known as an exclusion zone. The regulations stipulate that if the mammals are within the exclusion zone, pile driving activity must stop. Regulations mandate that operations can only occur when humans can visually see mammals. As such, restricted visibility operations (nighttime and fog) prohibit pile driving activity. Limiting pile driving activity increases the cumulative negative impact the operation has on the marine environment.

The customer pain point considered here is the existing global regulations to protect certain marine mammals from subsea noise created by the installation of subsea foundations used in offshore wind farms, acoustics emission during offshore surveys, and the construction activity it creates. Conventional techniques rely solely on distributed individuals with no performance accountability have been accepted as the industry norm. Hence, the affected marine system constructors need a more capable method for complying with the regulations in an effective manner—one that is not compromised by weather, poor visibility, or the users not being always aware of everything happening near the construction sites.

FIGURES

Various figures are included herein which illustrate aspects of embodiments of the disclosed inventions.

DESCRIPTION OF EXEMPLARY EMBODIMENTS

As used herein, an "actor" may comprise physical vessels, aircraft, autonomous underwater vehicles (AUVs), monopiles, or detected mammals. "Object" may comprise inanimate objects which include geofencing perimeters represented by an exclusion zone, monitoring zone, outer zone, and/or bubble curtains that are positionally static and relative to an operation's epicenter. "Software controls" may comprise display menu button regions where such are used to control software operations.

Figure 1:
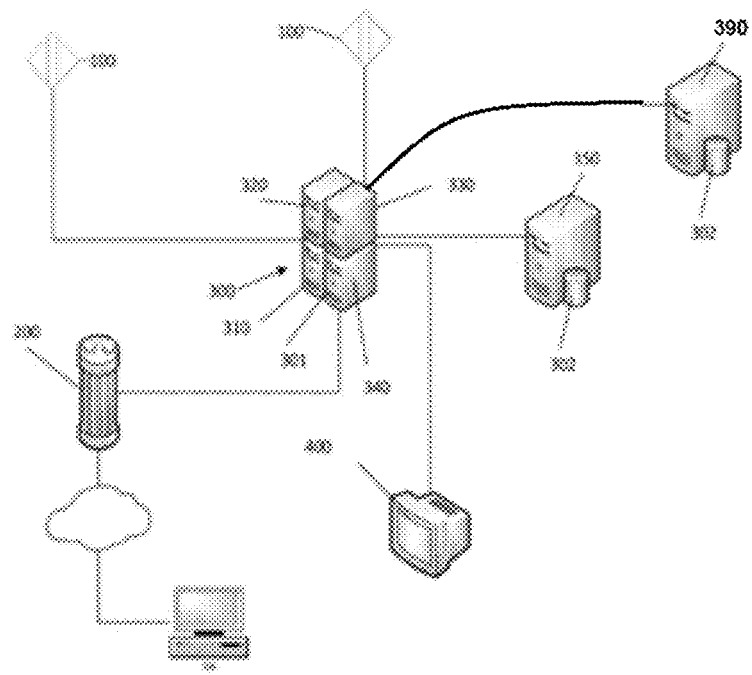
FIG. 1 is a schematic view of an exemplary system.
Figure 2:
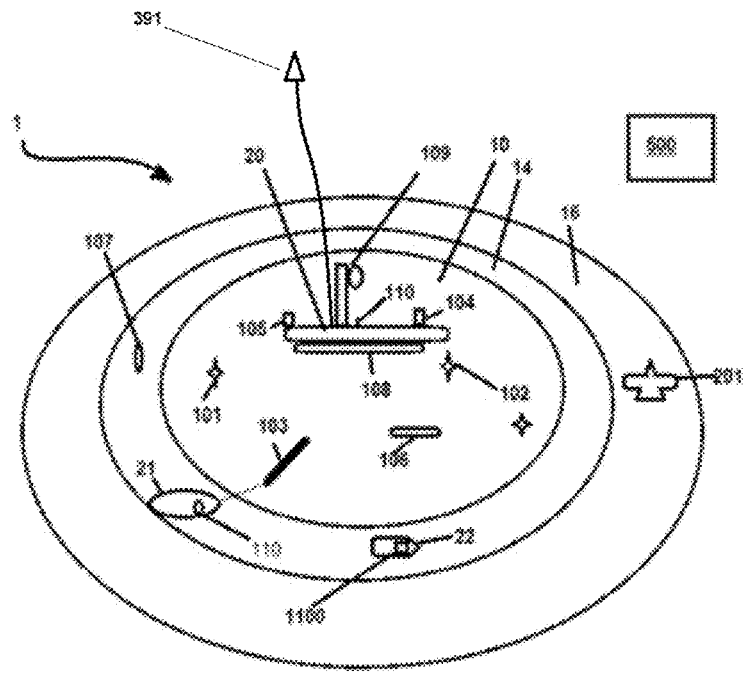
FIG. 2 is a schematic view of zones and components of an exemplary system.

Referring generally to FIG. 1 and FIG. 2, system 1, useful for identification of marine mammalian species present at an offshore construction site using a predefined set of sensors, is described herein. System 1 comprises a situational awareness tool which primarily supports timely and informed decision making with respect to commencing and terminating operations such as those prescribed in the Endangered Species Act and the Marine Mammal Protection Act.

System 1 aggregates information collected by plurality of sensors 100 which are tasked with monitoring ongoing marine actor and man-made activities within the offshore operations area, time stamps all incoming data streams, organizes, and records the data, and performs algorithmic manipulation on the data to display it in an actionable format in real time. Plurality of sensors 100 may comprise one or more of subsea passive acoustic sensor 101 (FIG. 2), subsea active acoustic sensor 102 (FIG. 2), passive acoustic monitoring towed array 103 (FIG. 2), surface camera 104 (FIG. 2), thermal imaging camera 105 (FIG. 2) that may comprise a cooled mid-wave infrared (MWIR) or a long-wave infrared (LWIR) camera or sensor, passive acoustic monitoring static array 106 (FIG. 2), acoustic buoy 107 (FIG. 2), set of sensors 108 (FIG. 2) on unmanned platform 20 (FIG. 2), radar 109 (FIG. 2), automatic identification system (AIS) 110 (FIG. 2), GPS 111 (FIG. 2), or the like, or a combination thereof.

In addition, one or more data processors 300 are present and comprise software and/or hardware components such as one or more real-time monitors 310 which operatively in communication with plurality of sensors 100 and a predetermined set of data input ports 301; one or more recorders 320, which record multimedia that comprises video and/or audio streams and/or text sequences; one or more data stream processors 330 to process data streams; and one or more data communicators 340 which operatively communicate in real time with data stream processors 330. Typically, one or more display units 400 are present as well as one or more remote systems 500,800 to display the data streams in presentable form in real time to one or more operators 520 (FIG. 3).

Figure 3:
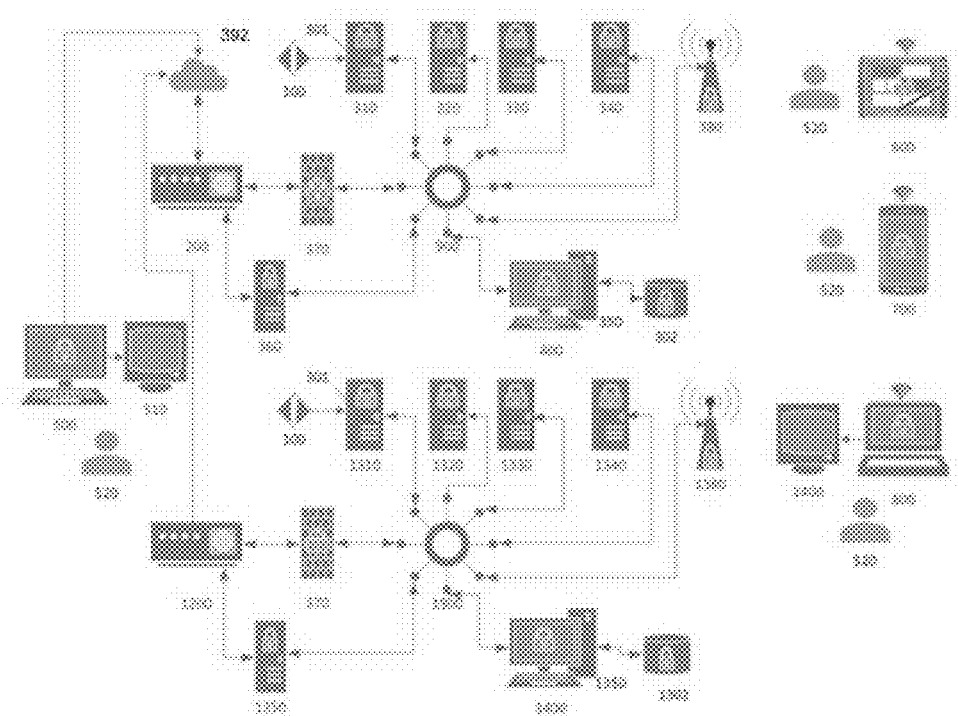
FIG. 3 is a schematic view of an exemplary system.
Figure 4:
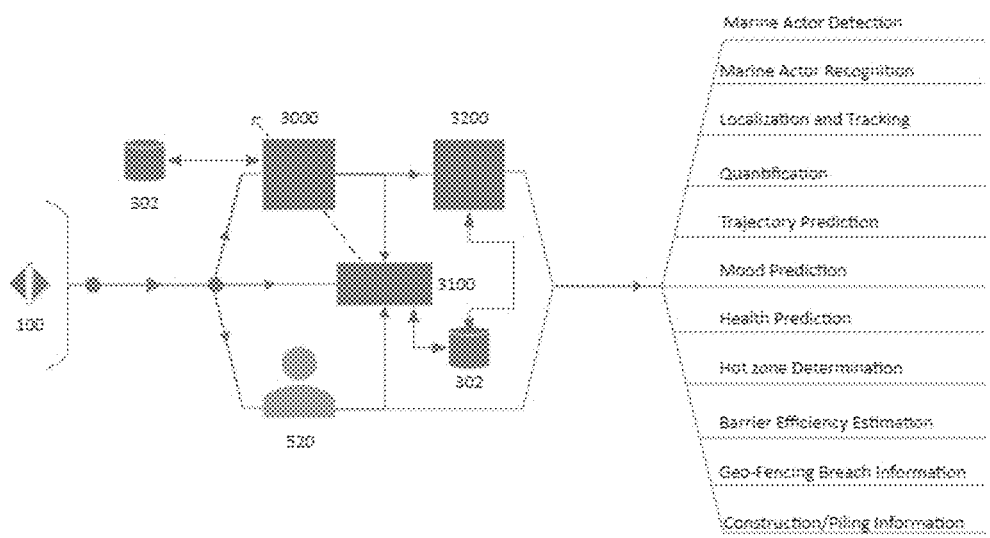
FIG. 4 is a schematic view of an exemplary system illustrating various functions of the system.

Referring additionally to FIG. 3 and FIG. 4, in embodiments the disclosed invention further comprises one or more secure web-applications and/or one or more web services implementing additional features that make it a single, secure, configurable, controllable, fully integrated, and reliable tool for multiple operators working at multiple marine sites with multiple projects for detection, classification and/or recognition, and tracking of marine mammalian species and/or any marine actors. Since communication between offshore and onshore is limited in bandwidth, data stream compression using transcoding of the multimedia may be added to one or more data processors 300 or their component processors 310,320,330,340 and the data stream duplicated or otherwise reconstructed onshore through media servers, e.g., 800 (FIG. 3), for quick access from users 520 (FIG. 3) onshore without using the bandwidth available between onshore and offshore. Reliability and availability are enhanced by avoiding single point of failures and redundancies applied on databases, broker services, API servers, media servers and web servers at both onshore and offshore.

System functionality and reliability may be enhanced through incorporating one or more machine intelligence modules as described herein in tandem with one or more learning or training modules as described herein and one or more data fusion modules as described herein to accurately monitor marine mammalian species and alert users/operators 520 (FIG. 3).

An embodiment illustrated in FIG. 1 is enhanced as shown in FIG. 3 to incorporate redundancy to ensure high availability. As illustrated in FIG. 3, system 1 is typically further available at offshore and onshore sites with high availability by, e.g., incorporating various components spread across multiple computers (or other computing devices) on a datacenter network and/or on a cluster of computational platforms as native and/or containerized modules and/or on a cluster of cloud platforms that systematically store multimedia data from multiple marine sites, collected through multiple data processors, in multiple databases and/or network media recorders, individually and/or collectively, and stream it through direct or load balanced network media streamers so that the tool guarantees high availability to operators worldwide. In preferred embodiments, system 1 typically comprises one or more multiband communicators 340 or the like; one or more network switches or routers 900,1900 that support ring topology and/or redundant multiport star topology, or the like, and interconnect various processors such as real-time monitors 310, recorders 320, data stream processors 330, data communicators 340; one or more network isolators 370 or the like; one or more multiband wireless transceivers 380 or access points or the like; one or more wireless enabled computers 800 and/or tablets 600 and/or mobile phones 700 or the like; one or more server computers such as data processors 300 or the like; one or more data broker software applications or the like; one or more audio-visual media server software applications; and software executing in or across the computer platforms, e.g., data processors 300; one or more email servers, both at marine environment and onshore, which can be part of data processors 300 or standalone; one or more chat servers both at marine environment and onshore, which can be part of data processors 300 or standalone; one or more user authentication and/or authorization servers or the like both at marine environment and onshore, which can be part of data processors 300 or standalone; and one or more key stores, which can be part of data processors 300 or data stores 302,1302.

Sensors 100 may include daylight cameras or the like, night-vision cameras or the like, one or more hydrophones, one or more hydrophone arrays, one or more tugged hydrophone arrays, one or more static hydrophone arrays, one or more radars, one or more GPS systems, one or more AIS Radios, and/or one or more PAM buoys. Satellite modems 391 (FIG. 2) may be used as well.

Display screens, e.g., 400, may be used to present audiovisual alarms and indicators.

Typically, system 1 is operative within one or more zones such as zone 10 but may have additional range. For example, system 1 may comprise one or more barriers 14 that attenuate the level of disturbance generated through water borne activity, such as construction related activity including sound pollution and/or the like. Marine actor specific virtual geofencing 16 may be present to alert operators 520 upon breach such as by marine actors that include protected species, intruding vessels and the like.

In contemplated embodiments, system 1 may further comprise one or more interchange servers 390 acting as, e.g., video conference servers, email servers, chat servers, or the like, or a combination thereof, and/or offshore base stations or marine sites for observation such as shown with smartphones 600, tables 700, and/or remote computers 800. These can be add-on implementations to the data output processors 350, 1350. In addition, interchange server 391 may be configured to enable mirroring of data processor 300 in cloud 392 and/or an onshore datacenter such as 800 that stream text and audio-visual data via one or more web applications or the like, or a combination thereof, to reduce the data bandwidth between onshore systems and marine systems, to increase the access speed for clients, and to enhance the availability.

In the operation of exemplary embodiments, system 1 is generally based on hardware available as commercial off the shelf (COTS) and scalable software that includes custom software implementations of machine intelligence and web services. Enhanced system 1 comprises embodiments that provide an integrated, highly available, and secured single system 1 to a user/operator 520 of multiple marine sites from onshore as well as offshore users/operators 520 to integrate different data streams (e.g. audio analysis, videos, maps) into one platform, enhance safety of assets (e.g., predict and alarm users/operators 520 of any potential collision of assets with mammals/other assets), enhance the monitoring capability (spatiotemporal ML algorithms monitor multiple audiovisual feeds simultaneously and detect marine actors that include protected species and the like automatically, better, and reliable than possible by a human), make users/operators 520 aware of events occurring in a monitored area and provides actionable insights, and help reduce cost of operations via reducing the number of persons required onboard.

The software operatively resident in, e.g., data processors 300, typically comprises one or more data storage server software applications; one or more network multimedia recorders or the like; one or more web server software applications; one or more media transcoder software applications; one or more Certificate Authority (CA) certificates or the like; one or more System-as-a-Service (SaaS) subscriptions or the like and/or one or more Platform-as-a-Service (PaaS) subscriptions or the like and/or one or more Infrastructure-as-a-Service (IaaS) and/or one or more Containers-as-a-service (CaaS) that include datastore subscriptions or the like, key vault subscriptions or the like, virtual machine subscriptions and container cluster subscriptions or the like. In embodiments, custom algorithms are included that include triangulation, time-of-flight, optical-flow and/or the like, to track movement of mammals from spatiotemporal data analysis of audiovisual signals, visual features spotted via AI and manual spotted features by humans. In certain embodiments, third party software tools are integrated to custom algorithms mentioned above to perform spatiotemporal data analyze of audio-visual data. Software modules integrating stationary and moving base stations offshore that include, monopile ships, survey ships and/or the like.

Referring additionally to FIG. 3, generally, data from sensors 100 are communicated through multiple multiband communicators 200, 1200 for redundancy. The data are processed through one or more data processors of 300, 1300 where "1300" is the collective term for one or more real-time monitors 1310 operatively in communication with the plurality of sensors 100 and data input ports 1301 through which remote sensors 1100 are connected; one or more recorders 320, 1320 operative to record audio-visual data gathered from the plurality of sensors 100; one or more data stream processors 330, 1330 operative to process the data streams received from recorders 320, 1320 or directly from the plurality of sensors 100 into a predetermined set of specific information; and one or more data communicators 340, 1340 operatively in real time communication with data stream processors 330, 1330. In embodiments, it can include pan-tilt-zoom-focus (PTZF) control output to the plurality of sensors 100, and actuators, e.g., the sounding alarm outputs and/or indicator outputs. Remote sensors 1100 may be part of or otherwise associated with autonomous underwater vehicle 22. Automatic identification system (AIS) 110 may be operative within a specific zone, e.g., zone 21.

Data processor 300,1300 may further comprise an indexed database resident in data store 302,1302 defining an information repository comprising collected sensory information, where the indexed database is operatively in communication with one or more direct or transcoded data stream processors 330, 1330.

In most embodiments, still referring to FIG. 3, one or more data output processors 350, 1350 are operatively in communication with one or more data processors 300, 1300 and can be used to host web services, web applications and machine intelligence related modules. A data communicator network, e.g., one interconnecting data communicators 340, 1340, and a data processor network, e.g., one using switches or routers 900,1900, are isolated using a secure network isolator 370 and may be duplicated with one or more isolators 370,1370 for redundancy. Display 1400 is identical to 400 but operatively in connection with 1300. One or more virtual hosts 360 may be used to implement secure bridge access to a data processor network, e.g., using switches/routers 900, 1900, through user authentication that uses one or more ring topologies and/or multi-port star topologies to enhance fault tolerance. This enhanced embodiment adds one or more wireless transceivers 380, 1380 that facilitate connection to the data processor network in a marine environment via one or more wireless enabled computers 800, tablet PCs 600, and/or smart phones 700.

Data stream compression may be used, including using transcoding of the multimedia, and added to one or more data processors and duplicated them onshore through media servers for quick access from users onshore without using the bandwidth available between onshore and offshore.

Enhanced system 1 may further comprise one or more web application software modules implementing one or more web services secured through user authentication and authorization in data output processors 350, 1350 to interact with text, audio-visual data and PTZF controls through internet browsers or the like using multiple compressed video streams which are displayed through multiple browser tabs and/or browser instances in one or more extended displays, e.g., display 2400 attached to one or more computers 800, one or more tablet PCs 600, and/or one or more smart phones 700. In addition, enhanced system 1 may comprise one or more machine intelligence modules 3000 or the like operatively in communication with the plurality of sensors 100 and data input ports 301 and 1301 to measure and/or estimate and/or forecast the marine environment's situation, location of events, quantification of objects involved, their trajectory of motion, behavior and/or mood and/or health through fusing data from the plurality of sensors 100 and data input ports 301 and 1301. One or more machine learning modules 3100 and/or training modules 3100 or the like do the training of machine intelligence modules 3000 using the training data provided by operators 520, the real time multimedia data received from the plurality of sensors 100 and the outputs of machine intelligence modules 3000. One or more data fusion modules 3200 which are operatively in communication with machine intelligence modules 3000 weigh the results and merge them to a desired set of measures and/or estimates and/or forecasts. Machine intelligence modules 3000 additionally implement one or more sound barrier efficiency feedback modules, marine actor tracking modules and hot zone identification modules. These modules are add-on implementations to the data output processors 350, 1350.

The software can therefore provide marine actor trajectory prediction, plotting and collision warning as well as automated reports to stakeholders.

Although described in terms of ocean related matters, enhanced system 1 may be used for animal and/or bird detection and/or recognition, wild or farm animal and/or bird health and/or mood monitoring, or the like, or a combination thereof.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A system for identification of marine mammalian species present at an offshore location, comprising:
  a) a predetermined set of data input ports;
  b) a plurality of sensors operatively in communication with the predetermined set of data input ports;
  c) a data processor operatively in communication with the plurality of sensors, the data processor comprising:
    i) a real-time monitor operatively in communication with the plurality of sensors and the predetermined set of data input ports;
    ii) a data recorder operatively in communication with the real-time monitor, the data recorder comprising a data store;
    iii) a data stream processor operatively in communication with the data recorder and the real-time monitor and configured to process a data recorder stream;
    iv) a data communicator operatively in real time communication with the data stream processor and the real-time monitor;
    v) a network switch or router operatively connected to and interconnecting the data recorder, the data stream processor, the data communicator, and the real-time monitor to create a data processing network; and
    vi) software resident in the data processor, the software comprising:
      (1) a training machine learning module operatively in communication with the plurality of sensors and the predetermined set of data input ports;
      (2) a machine intelligence module operatively resident in the data processor and operative to function in tandem with the training machine learning module, the machine intelligence module operatively in communication with the plurality of sensors and the predetermined set of data input ports and configured to measure, estimate, and/or forecast a marine environment's situation, a location of an event, quantification of objects involved, trajectory of motion of the objects, and/or behavior and/or mood and/or health; and
      (3) a data fusion module operatively resident in the data processor and operative to monitor marine mammalian species and alert an operator;
  d) a display operatively in communication with the data processor; and
  e) a data output processor operatively in communication with the data processor.

2. The system of claim 1, wherein the data stream processor is operatively in communication with the plurality of sensors.

3. The system of claim 1, wherein the data output processor further comprises output software operatively resident in the data output processor, the output software comprising:
  a) an Internet host service;
  b) a predetermined set of Internet enabled applications; and
  c) machine intelligence software.

4. The system of claim 3, wherein the software further comprises a predetermined set of Internet enabled applications configured to implement a predetermined set of features that make it a single, secure, configurable, controllable, fully integrated, and reliable tool for multiple operators working at multiple marine sites with multiple projects for detection, classification and/or recognition, and tracking of marine mammalian species and/or any marine actors.

5. The system of claim 4, wherein the predetermined set of Internet enabled applications further comprise functionality implementing one or more web services secured through user authentication and authorization in the data output processor to interact with text, audio-visual data and pan-tilt-zoom-focus ("PTZF") controls through internet browsers using which, multiple compressed video streams are displayed through multiple browser tabs and/or browser instances in one or more extended displays attached to one or more computers, one or more tablet PCs and one or more smart phones.

6. The system of claim 1, further comprising:
   a) a multiband communicator operatively in communication with the data processor; and
   b) a remote system operatively in communication with the data processor via the multiband communicator.

7. The system of claim 6, wherein the remote system further comprises a visual display adapted to display a data stream received from the data processor in presentable form in real time to a human operator.

8. The system of claim 1, further wherein the software further comprises:
   a) tracking software configured to provide a predetermined set of functionality; and
   b) integration software configured to provide integration functionality to integrate stationary and moving base stations offshore that include, monopile ships, or survey ships.

9. The system of claim 8, wherein the predetermined set of functionality comprises triangulation of an object located proximate an offshore structure, time-of-flight of the object, optical-flow or movement tracking of objects from spatiotemporal data analysis of audiovisual signals, visual features spotted via artificial intelligence, and manually spotted features by a human.

10. The system of claim 1, further comprising an attenuation barrier configured to attenuate a level of disturbance generated through water borne activity.

11. The system of claim 1, further comprising marine actor specific virtual geofencing, the marine actor specific virtual geofencing configured to alert an operator upon a breach of the marine actor specific virtual geofencing by a marine actor.

12. The system of claim 1, further comprising:
   a) a network isolator operatively in communication with the network switch or router;
   b) a virtual host; and
   c) a multiband communicator in communication with the network isolator and a cloud.

13. The system of claim 1, wherein the plurality of sensors comprises a subsea passive acoustic sensor, a subsea active acoustic sensor, a passive acoustic monitoring towed array, a surface camera, a thermal imaging camera, a passive acoustic monitoring static array, an acoustic buoy, a sensor disposed on or proximate to an offshore structure, a radar, an automatic identification system (AIS), or a GPS system.

14. The system of claim 1, further comprising an interchange server operatively in communication with the data output processor, the interchange server further configured to enable mirroring of the data processor in a cloud and/or an onshore datacenter.

15. A method of using a system to aggregate information collected by a plurality of sensors and monitor ongoing marine actor and man-made activities within an offshore operations area with a reduced number of persons required at the offshore operations area to accomplish the monitoring, the system for identification of marine mammalian species present at an offshore location comprising a predetermined set of data input ports; the plurality of sensors which are operatively in communication with the predetermined set of data input ports; a data processor operatively in communication with the plurality of sensors where the data processor comprises a real-time monitor operatively in communication with the plurality of sensors and the predetermined set of data input ports, a data recorder comprising a data store, a data stream processor configured to process a data recorder stream, a data communicator, and software resident in the data processor where the software comprises a training machine learning module operatively in communication with the plurality of sensors and the predetermined set of data input ports, a machine intelligence module operatively resident in the data processor and operative to function in tandem with the training machine learning module where the machine intelligence module is operatively in communication with the plurality of sensors and the predetermined set of data input ports and configured to measure, estimate, and/or forecast a marine environment's situation, a location of an event, quantification of objects involved, trajectory of motion of the objects, behavior and/or mood and/or health through fusing data from the plurality of sensors and the predetermined set of data input ports, and a data fusion module operatively resident in the data processor and operative to monitor marine mammalian species and alert an operator, and where the real-time monitor, data recorder, data stream processor, and data communicator are operatively interconnected via a network switch or router in a data processor network; a display operatively in communication with the data processor; and a data output processor operatively in communication with the data processor, the method comprising:
   a) aggregating data in the data processor obtained from the plurality of sensors into a set of incoming data streams;
   b) time stamping each data stream of the set of incoming data streams;
   c) organizing the time stamped set of incoming data streams;
   d) recording the organized time stamped set of incoming data streams in the data recorder;
   e) performing a predetermined set of algorithmic manipulations on the organized time stamped set of incoming data streams to allow display of the organized time stamped set of incoming data streams in an actionable format in real time on the display to make a human aware of events occurring in a monitored area and provide an actionable insight; and
   f) using the training machine learning module to train the machine intelligence module using training data provided by an operator, real time multimedia data received from the plurality of sensors, and outputs of the machine intelligence module.

16. The method of claim 15, wherein data from the plurality of sensors are communicated through multiple multiband communicators for redundancy.

17. The method of claim 15, wherein the system further comprises a wireless transceiver, the method further comprising using the wireless transceiver to facilitate connection to a data processor network in a marine environment via a wireless enabled computer, a tablet PC, or a smart phone.

18. The method of claim 15, wherein:
   a) the predetermined set of incoming data streams comprise audio analysis data, video data, and topographical data, the method further comprising using the predetermined set of incoming data streams to predict a potential collision of a detected object with a second object and create a human perceptible alarm of a predicted collision of the detected object with the second object; and
   b) the predetermined set of algorithmic manipulations comprise a spatiotemporal ML algorithm to monitor multiple audiovisual feeds simultaneously and detect marine actors that include protected species automatically.

19. The method of claim 15, wherein the machine intelligence module is operative to fuse data to measure, estimate, and/or forecast the behavior and/or mood and/or health using data from the plurality of sensors and data input ports, the method further comprising using a data fusion module which is operatively in communication with the machine intelligence module to weigh results and merge the weighed results to a desired set of measures, estimates, and/or forecasts.

20. The method of claim 19, further comprising using the machine intelligence module to implement a sound barrier efficiency feedback result, a marine actor tracking result, and a hot zone identification result.

\* \* \* \* \*